United States Patent [19]
Kovalick et al.

[11] 3,946,302
[45] Mar. 23, 1976

[54] POWER REGULATOR WITH R.M.S. OUTPUT VOLTAGE AS FUNCTION OF UNREGULATED D.C.

[75] Inventors: Albert W. Kovalick, Santa Clara; Kenneth D. Scholz, Palo Alto, both of Calif.

[73] Assignee: Hewlett-Packard Company, Palo Alto, Calif.

[22] Filed: Apr. 4, 1975

[21] Appl. No.: 565,309

[52] U.S. Cl. .................. 323/19; 307/265; 323/22 T
[51] Int. Cl.² ........................................... G05F 5/00
[58] Field of Search ........ 307/233 R, 264, 265, 266, 307/267, 273, 293; 323/1, 17, 19, 22 R, 22 T; 331/185, 186; 321/16

[56] References Cited
UNITED STATES PATENTS

| | | |
|---|---|---|
| 3,396,293 | 8/1968 | Harris ........................... 307/265 X |
| 3,571,626 | 3/1971 | Reif ............................... 307/293 X |
| 3,800,169 | 3/1974 | Diaz .............................. 307/265 X |

OTHER PUBLICATIONS

*IBM Tech. Disc. Bull.*, Vol. 14, No. 6; Nov. 1971; pp. 1838, 1839, "Phase–Lock Loop with Constant Duty Cycle", by F. W. Niccore.

*Electronics & Power*, Jan. 1972, vol. 18; p. 12.

*Primary Examiner*—Gerald Goldberg
*Attorney, Agent, or Firm*—F. David LaRiviere

[57] ABSTRACT

Utilizing the method and circuit described herein regulated power is provided by controlling the duty cycle of p. fixed frequency signal as a function of the amplitude of unregulated D.C. voltage applied. A thin film thermal printer utilizing this power regulator is also described herein.

6 Claims, 8 Drawing Figures

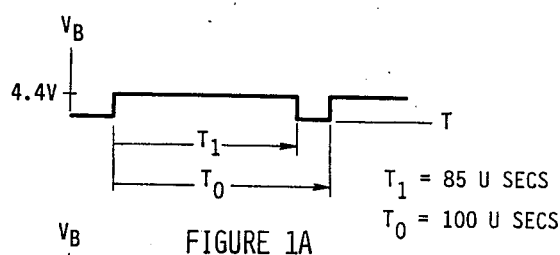
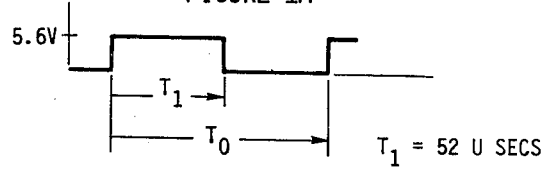
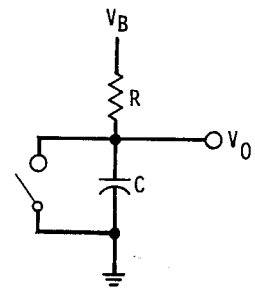
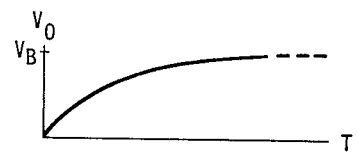
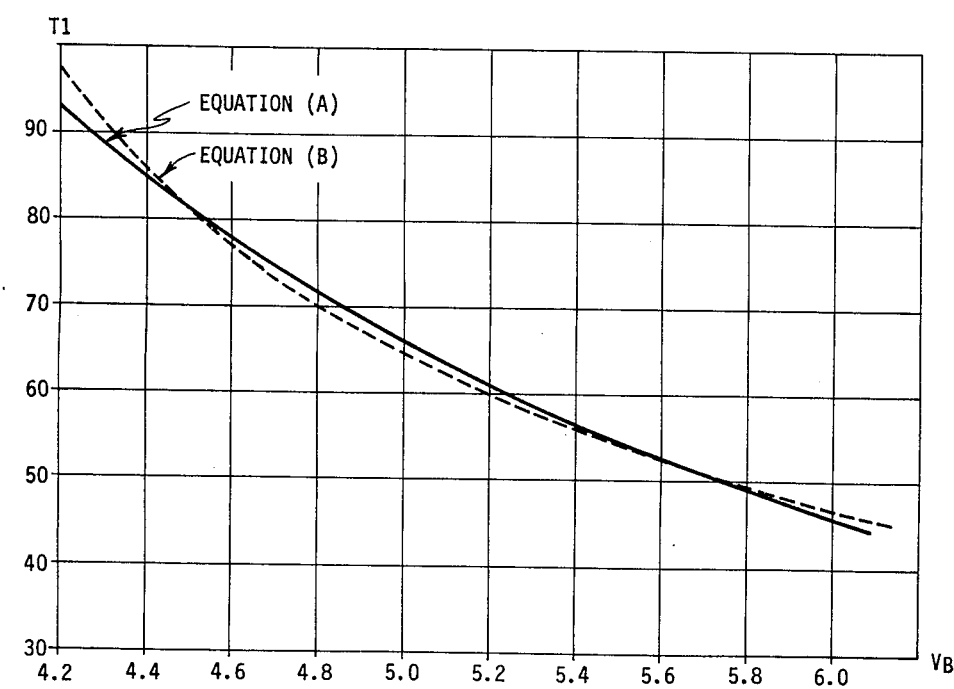

POWER REGULATOR WITH R.M.S. OUTPUT VOLTAGE AS FUNCTION OF UNREGULATED D.C.

BACKGROUND AND SUMMARY OF THE INVENTION

Prior art schemes to obtain constant power include the common voltage regulator. Such regulators, particularly the series pass regulator, are very inefficient since they must dissipate power equal to all of the load current times the difference between the unregulated and the regulated voltages. A switching regulator is more efficient than the series pass regulator but is usually more complicated and requires many more components. Other schemes to obtain regulated power involve complex analog building blocks such as multipliers and dividers. As the number and complexity of components increases, so does the cost.

The preferred embodiment of the present invention employs one quad comparator, 11 resistors and capacitors, and one zener diode and has an efficiency of approximately 90%. The circuit is designed to provide an output voltage having a root mean square (RMS) value regulated as a function of the duty cycle of an A.C. component and the magnitude of the unregulated D.C. component. The duty cycle is inversely proportional to the square of the D.C. component. The power regulator of the present invention provides a constant RMS voltage whose value is within 1% of nominal for a D.C. input voltage variation of approximately ±14%.

To maintain uniform print contrast, thin film thermal printer resistors must be energized to approximately the same temperature each time they are energized. The same temperature must be attainable even where the power source may not be constant, such as a battery. These resistors typically have a characteristic thermal time constant, i.e. a finite response time to heat up to a temperature proportional to the magnitude of D.C. voltage applied. Under constant use at lower D.C. voltage levels or if too much power is applied even for shorter time periods, these resistors tend to become thermally stressed, unreliable and ultimately crack over a relatively short time in use. These difficulties are overcome by employing the principles of the present invention. Where the period of the A.C. component of the output power waveform is less than the thermal time constant for the thin film resistor, the instantaneous voltage pulses will be averaged out to appear as a constant energy source without producing the thermal stresses in the resistor produced when a step function of purely D.C. voltage is applied. Thus, the useful life of each resistor will be extended yet will develop a constant temperature when energized for printing purposes.

DESCRIPTION OF THE DRAWINGS

FIG. 1A shows a voltage waveform having a value of 4.05 $V_{RMS}$.

FIG. 1B shows another voltage waveform having a value of 4.05 $V_{RMS}$.

FIG. 2A shows an equivalent circuit for producing voltage waveforms similar to those shown in FIGS. 1A and 1B.

FIG. 2B shows the output waveform of the circuit of FIG. 2A.

FIG. 3 compares the characteristic curves of equations A and B.

DESCRIPTION OF THE PREFERRED EMBODIMENT

Referring now to FIGS. 1A and 1B, the RMS value of both waves is given by the relation $$V_{RMS} = V_B \times \sqrt{\frac{T_1}{T_0}}$$

where
$V_B$ = D.C. voltage input;
$T_1$ = duration of positive portion of one period of the wave; and
$T_0$ = duration of total period of the wave.
Thus, at 10 KHz, $$T_1 = \left(10 \times \frac{V_{RMS}}{V_B}\right)^2 \mu s. \qquad (A)$$

For
$V_B$ = 4.4 volts
and
$V_{RMS}$ = 4.05 volts,
$T_1$ = 84.68 $\mu s$.
Similarly, for
$V_B$ = 5.6 volts
and
$V_{RMS}$ = 4.5 volts,
$T_1$ = 52.3 $\mu s$.
Hence, if the period of the A.C. component of the output voltage ($T_0$) and the range of the D.C. voltage ($V_B$) variation are known, the RMS value of the output voltage may be regulated by varying the duty cycle ($T_1$) of the A.C. component as an inverse function of the square of $V_B$ (D.C. component).

Referring now to FIG. 2A an equivalent circuit for approximating the above function is shown, the output voltage, $V_O$, of which is given by the relation $$V_O = V_B(1 - E^{-T/RC}).$$

Simplifying and solving for T, $$T = -RC \ln\left(1 - \frac{V_O}{V_B}\right),$$

where T is the time it takes C to charge to a voltage equal to $V_B$, as shown in FIG. 2B.

To determine that value of $V_O < V_B$ at which switch 1 should be closed in order to alternately charge and discharge capacitor C to produce the proper duty cycle ($T_1$) (that value being hereinafter referred to as $V_{REF}$), the last-mentioned equation is solved for appropriate values of $V_B$ and T. Therefore, setting
$V_B$ = 4.4 volts and 5.6 volts,
T = 85 $\mu s$. and 52 $\mu s$., respectively,
and
$RC = y$
and $$\left(\frac{V_{REF}}{5.6}\right) = x,$$

the following equations are solved simultaneously:

$$85 \mu s. = y\, Ln(1 - 1.27x),$$

and $$52 \mu s. = y\, Ln(1 - x).$$

Since $$x = 0.64$$

and $$y = 50.5\, \mu s.,$$

then $$\frac{V_{REF}}{5.6} = .64,\ V_O = V_{REF} = 3.58 \text{ volts and } RC = 50.5\, \mu s.$$

A plot of the relation $$T = (50.5\, \mu s.)\left(Ln\left(1 - \frac{3.58}{V_B}\right)\right) \quad (B)$$

and $$T = \frac{K_O}{V_B{}^2}\ \text{(see equation } (A)) \quad (C)$$

is presented in FIG. 3. It should be noted that the curve of equation (B) is within 1% of the curve of equation (A) over the range 4.4 volts to 5.6 volts.

Figure 4:
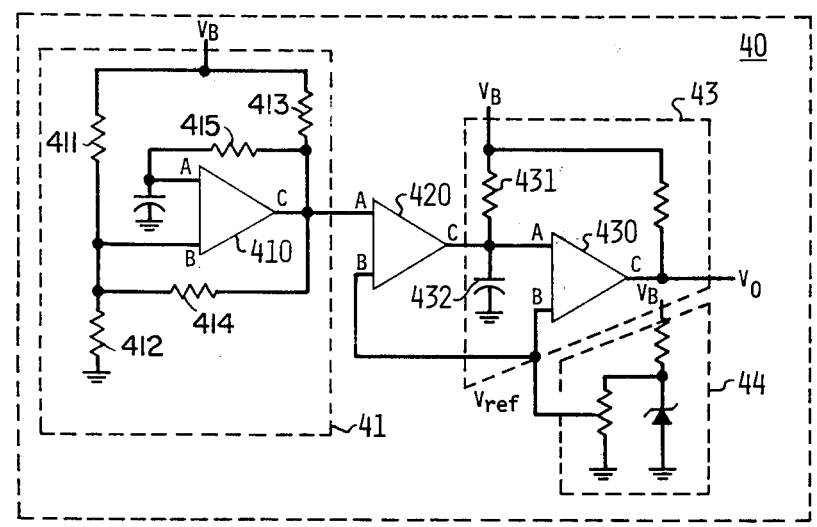
FIG. 4 is a circuit diagram of the power regulator according to the preferred embodiment of the present invention.

Power regulator 40, shown in FIG. 4, is constructed according to the preferred embodiment of the present invention and includes $V_{REF}$ circuit 44. Comparators 410, 420 and 430 are three of the four comparators comprising a quad comparator such as an LM 3302 or equivalent. Comparator 410 is coupled to resistors 411, 412, 413, 414 and 415 and to capacitor 416 to form an oscillator circuit 41 having a frequency of 10 KHz. Comparator 420 is used to invert the oscillator output waveform which is then applied to capacitor 432. Comparator 430 changes state when the voltage across capacitor 432 equals $V_{REF}$.

Figure 5:
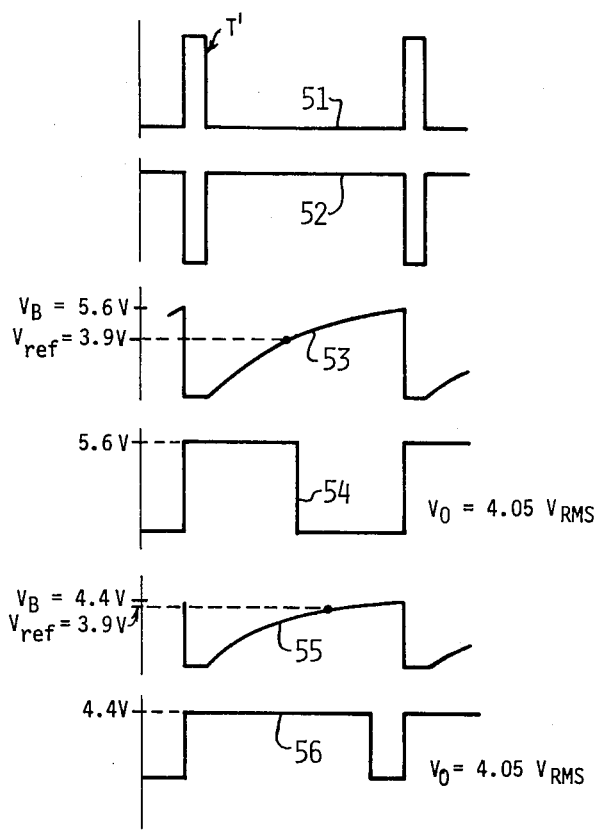
FIG. 5 is waveforms produced by the embodiment of FIG. 4.

The output voltage of oscillator circuit 41 via comparator 420 alternately charges and discharges capacitor 432. Referring to FIG. 5, the T' portion signal 51 applied to input A of comparator 420 represents the discharge or recovery time of capacitor 432. Thus T', typically amounting to approximately 12 $\mu s.$, represents a delay in the output waveform of the present invention. The values of $V_{REF}$, resistor 431 and capacitor 432 are therefore adjusted to compensate for this recovery time. Thus, $$85\, \mu s. = 12\, \mu s. - RC \times Ln\left(1 - \frac{V_{REF}}{4.4}\right)$$

and $$52\, \mu s. = 12\, \mu s. - RC \times Ln\left(1 - \frac{V_{REF}}{5.6}\right).$$

After setting $y = RC$ and $$x = \frac{V_{REF}}{5.6},$$

new values for $V_{REF}$ and for resistor 431 and capacitor 432 may be determined. Thus, $$V_{REF} = 3.92\ V,$$
$$RC = 32\, \mu s.,$$

or, $$T = 12\, \mu s. - 32\, \mu s.\ Ln\left(1 - \frac{3.92}{V_B}\right).$$

Referring again to FIG. 5, signal 52 appears at the output C of comparator 420 in response to signal 51 applied to input A of that comparator. Signal 54, which may be expressed mathematically by $$V_{RMS} = \sqrt{(V_{RMS})^2 + (V_{DC})^2},$$

is the output voltage at output C of comparator 430 in response to signal 53 at input A and $V_{REF} = 3.9$ V at input B thereof. Similarly, signal 56, whose RMS value is equal to that of signal 54, is produced at output C of that comparator in response to signal 55 at input A and $V_{REF} = 3.9$ V at input B. Thus, signals having both A.C. and D.C. components which produce substantially equal RMS values have been produced as a function of the duty cycle of the A.C. component wherein that duty cycle is inversely proportional to the square of the magnitude of the D.C. component.

The power regulator circuit of the present invention is suited to applications where a load must be supplied with constant energy independent of supply voltage. One application of the present invention is in the power drive circuitry for the thin film resistors incorporated into the print head of a battery-powered thin film thermal printer. Since output power remains constant with changes in $V_B$, the print contrast is uniform over a broad range of battery voltages.

Figure 6:
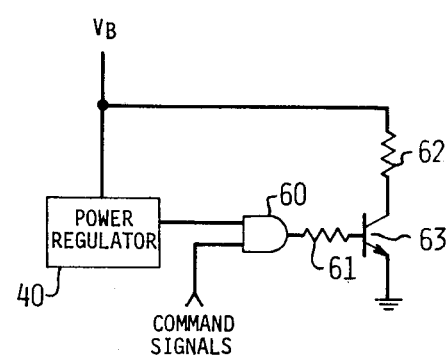
FIG. 6 is a circuit for controlling power delivered to the thermal resistors of a thermal printer employing the present invention.

Referring to FIG. 6, the output of the power regulator of the present invention is coupled to one input of AND gate 60. The other input of AND gate 60 is coupled to a source of thermal resistor command signals such as that described in copending U.S. Patent Application Ser. No. 508,111 entitled "Method and Apparatus for Enhancing and Maintaining Character Quality in Thermal Printers", filed Sept. 23, 1974, by Albert W. Kovalick and assigned to the assignee hereof and which is incorporated by reference herein. Resistor 62, which represents one of seven dots (resistive heating element) in a typical thermal printer, is energized by transistor 63 when enabled by the output of gate 60.

We claim:

1. A power regulator energized by unregulated D.C. voltage comprising:

an oscillator for producing a first signal having a first duty cycle;

charge storing means coupled to the oscillator for producing a second signal having a second duty cycle in response to the first duty cycle of the first signal and the magnitude of the unregulated D.C. voltage; and comparator means coupled to the charge storing means for comparing the magnitude of the second signal with a reference signal and for producing an output signal having a substantially constant RMS value as a function of the duty cycle of the second signal and the magnitude of the unregulated D.C.

voltage when the magnitude of the second signal exceeds the reference signal.

2. A power regulator as in claim 1 wherein the output signal includes A.C. and D.C. components, said A.C. component being inversely proportional to the square of the magnitude of the D.C. component.

3. A power regulator as in claim 1 wherein:
the first signal has first and second phases;
the second signal has first and second phases, said first phase representing the amount of electrical charge stored in response to the first phase of the first signal and the unregulated D.C. voltage; and
comparator means compares the magnitude of the first phase of the second signal with the reference signal and produces an output signal having a substantially constant RMS value as a function of first phase of the second signal and the magnitude of the unregulated D.C. voltage when the magnitude of the second signal exceeds the reference value.

4. A power regulator as in claim 3 wherein the duration of the first phase of the second signal is a function of the magnitude of the unregulated D.C. voltage.

5. A power regulator as in claim 4 wherein the duration of the first phase of the second signal is inversely proportional to the square of the magnitude of the unregulated D.C. voltage.

6. A power regulator as in claim 1 wherein the duty cycle of the output signal is a function of the magnitude of the unregulated D.C. voltage.

* * * * *